March 3, 1970 H. EISELE ET AL 3,498,093
POSITION CONTROL SYSTEM
Filed Nov. 9, 1967 2 Sheets-Sheet 1
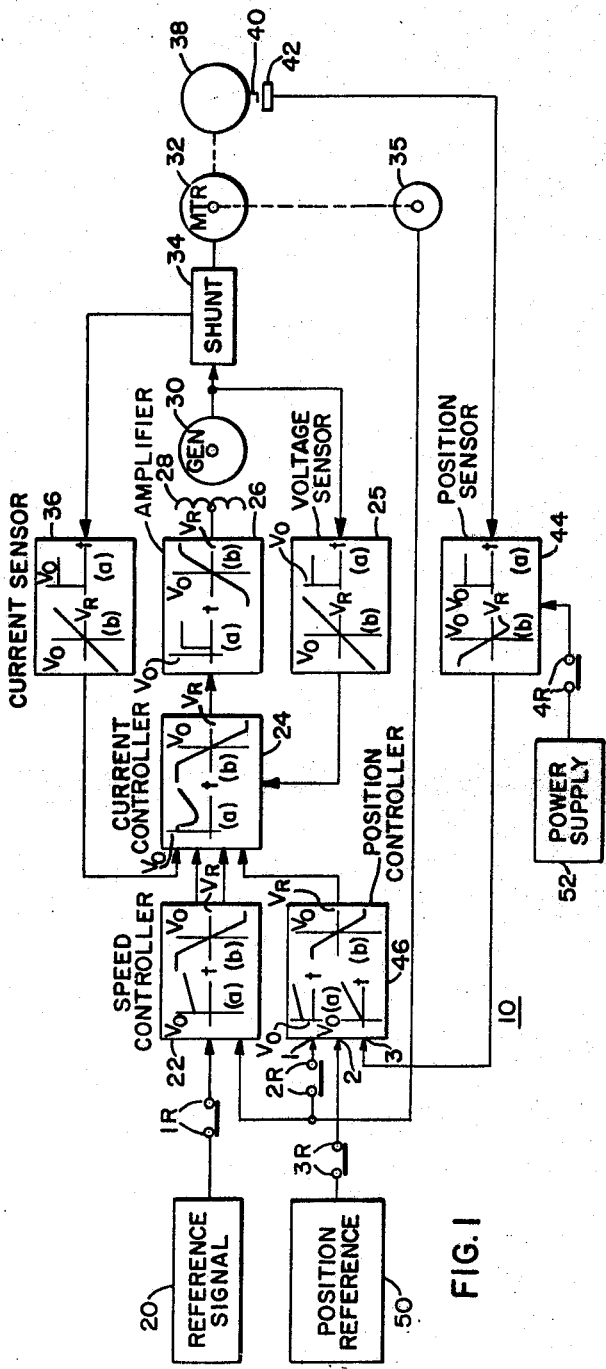
FIG. 1
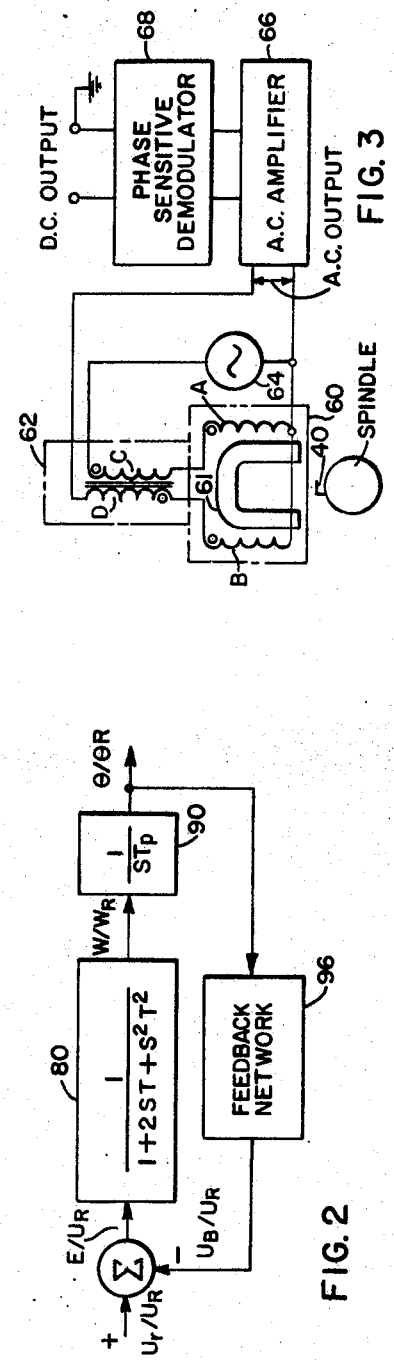
FIG. 3
FIG. 2
INVENTORS
Hermann Eisele &
Mohammed Safiuddin
BY *Brodahl*
ATTORNEY
WITNESSES:

United States Patent Office 3,498,093
Patented Mar. 3, 1970

3,498,093
POSITION CONTROL SYSTEM
Hermann Eisele, Williamsville, and Mohammed Safiuddin, Buffalo, N.Y., assignors to Westinghouse Electric Corporation, Pittsburgh, Pa., a corporation of Pennsylvania
Filed Nov. 9, 1967, Ser. No. 681,707
Int. Cl. B21b 27/12
U.S. Cl. 72—8     10 Claims

ABSTRACT OF THE DISCLOSURE

This disclosure sets forth apparatus for accurately positioning the roll receiving spindles to receive the new rolls in an automatic roll changing system for a steel mill. During the positioning operation, a signal functionally related to the displacement of the spindle from its desired roll receiving position is generated which then provides a linear or non-linear feedback signal to a position controller; thereupon, the position controller provides a signal which will turn the spindle to its desired orientation. The system requires only additional regulator functions in cooperation with the main drive motors thus dispensing with the auxiliary drive motors, inching clutch, clutch to disengage the main drive motors, pulse generators, and other hardware commonly found in a conventional roll changing system.

BACKGROUND OF THE INVENTION

The present invention relates, in general, to a position control system, and, more particularly to a position control system for positioning the spindle for roll changing in a steel mill.

It is frequently necessary because of conditions of roll surface wear to change the roll sets at the various stands in a rolling mill. Inasmuch as the mill is not operable during the time required to change the rolls, it is highly desirable to complete the change in the shortest possible time. Thus, methods and systems for automatic roll changing have been developed to reduce cost by increasing production time and decreasing the amount of manpower needed to change work rolls.

Prior to changing rolls, the new rolls and female ends of the spindles on to which the rolls fit are accurately adjusted to a defined position whereby the spindle key is in line with the roll slots. Then the rolls are pushed onto the mill by a hydraulic system.

There have been numerous systems developed for the accurate alignment of the spindles to the roll receiving positions which generally fall into two categories:

(1) The spindle is positioned by a helper drive which is connected by the main shaft through a clutch. This clutch is only engaged during the spindle positioning process. Such a system requires considerable additional equipment and maintenance, and the existing backlash in the clutch and additional gears makes accurate positioning of the spindle difficult.

(2) The main drives, themselves, are used to turn the spindles to their roll receiving position. This system requires only additional regulator function.

(3) The positioning of the spindles can be done either by an open loop control or by a closed loop position control. In an open loop position control, either voltage, current, or speed loop is employed to turn the shaft slowly until the desired position is reached. When this is indicated by a limit switch, the main drive is automatically stopped. The main difficulty with such a system is that accurate positioning of the spindle is impossible because of the varying friction level in the drive bearings at very low speeds.

SUMMARY OF THE INVENTION

It is, therefore, a general object of the present invention to provide a new and improved roll changing system requiring no additional mechanical equipment.

An additional object of the present invention is to provide a new and improved roll changing system requiring only additional regulator functions.

Yet a further object of the present invention is to provide a new and improved roll changing system which eliminates backlash due to clutches, couplings, and gears which are present in helper drive systems.

Another object of the present invention is to provide a new and improved roll changing system using a closed loop position control to eliminate the inaccuracy normally caused by the variable friction level in the drive bearings.

A further object of the present invention is to provide a new and improved roll changing system whereby a position feedback signal is generated by a position sensor and used to position the spindle within predetermined limits.

Still a further object of the present invention is to provide a new and improved roll changing position whereby, if the spindle is not at its desired position, it will slowly turn to its proper and desired orientation without any overshoot.

A still further object of the present invention is to provide a new and improved roll changing system whereby the spindle oscillates with an amplitude and frequency described by predetermined "limit cycle."

In accordance with the principles of the present invention, a closed loop position control is used for spindle positioning. A position feedback signal is generated either by an ON-OFF type or by a linear position sensor. The application of an ON-OFF type sensor causes the drive to oscillate with an adjustable amplitude around the desired roll changing position. The oscillation can be eliminated, however, if two ON-OFF sensors are used to create a three-point position signal. In this case, the spindle comes to a complete stop within a deadband of the desired roll changing position.

The objects of our invention hereinbefore recited are merely illustrative. Other objects and advantages will become more apparent from the study of the following specification when made in conjunction with the accompanying drawings.

DESCRIPTION OF THE DRAWING

FIGURE 1 is a system block diagram of a speed regulator system including position regulator apparatus;

FIG. 2 is the mathematical model of the speed regulating system using Laplace transforms;

FIG. 3 shows a position sensor configuration;

DESCRIPTION OF PREFERRED EMBODIMENT

Figure 4:
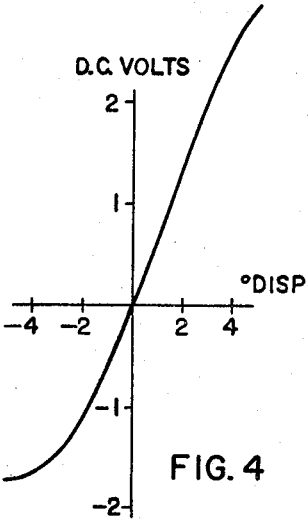
FIG. 4 is a position sensor transfer curve for a linear regulator relating spindle displacement to output voltage.

Referring now to FIG. 1, a position control system for roll changing using the main drive is diagrammatically shown and denoted by the numeral 10.

During the normal operation of the rolls, a reference signal 20 serves as input to a speed controller 22. Interposed between the reference signal 20 and a speed controller 22 is relay contact 1R which is normally closed during rolling and normally opened during roll changing. Output from the speed controller 22 is then fed to a current controller 24 and then to an amplifier 26 which controls the excitation of the generator field 28.

Acting in response to excitation of the generator field 28 is a generator 30 which is the source of power for the main drive motor 32. Armature current for the motor is fed by a shunt circuit 34 and a current sensor 36 which acts to provide a feedback signal to the current controller 24. A voltage sensor 25 monitors the voltage of the generator 30 and gives a voltage feedback signal to the current controller 24 whenever the motor 32 is disconnected from the generator 30. The speed of the main drive motor 32 is continuously monitored by a tachometer 35 which provides a speed feedback signal to the speed controller 22. The motor 32 is connected through gearing mechanisms to the spindle 38. Mounted on the spindle 38 is an actuator 40 which provides positioning information to a position sensor 44 as it comes into proximity with the sensing elements 42. The position sensor 44 has an output signal which is fed to a position controller 46. Also connected to the position controller 46 is the speed feedback signal from the tachometer 35 to the relay contact 2R. A position reference signal 50 is provided upon closure of relay contact 3R and acts as a speed reference signal for positioning the spindle 38 when it is substanially removed from its desired roll receiving position. Once the spindle moves within a preset limit of its roll receiving position, contact 3R is opened such that only the signal from the position sensor 44 is providing an input to the position controller 46. A power supply 52 energizes the position sensor 44 upon closure of the relay contact 4R.

During the normal rolling operation, the position controller 46 and the position sensor 44 are kept inoperable. Relay contact 2R is also kept opened to thus isolate the signal from the tachometer 35 from the position controller 46. The relay contact 4R is opened to deenergize the position sensor 44 and the sensing element 42. Relay contact 1R connects the reference signal 20 to the speed controller 22 which when closed provides the operating signal for the normal rolling operation. Then, at a time when positioning is desired, the relay contact 1R is opened to cut off the reference signal 20 from the speed controller 22. Meanwhile relay contacts 2R, 3R and 4R are closed to energize their respective apparatus and provide the necessary inputs to the position sensor 44 and position controller 46. When the spindle 38 is substantially removed from its desired roll receiving position, a signal, generated by the action of the actuator 40 on the sensing element 42 is fed from the position sensor 44 to the position controller 46. A position reference signal 50 connected to the position controller 46 provides a signal to the current controller 24 demanding the necessary armature current to turn the spindle 38. During roll positioning operations, the speed controller 22 is completely disabled from its normal control function and is replaced by the position controller 46. The closing of relay contact 2R connects the tachometer feedback signal to the position controller 46.

The position controller 46 consists of an operational amplifier with a capacitor feedback so as to act as an integrator with respect to the input from the position reference signal 50 at terminal 2 and the input from the position sensor 44 at terminal 3. However, a capacitor-resistor input at terminal 1, where the tachometer is connected, provides a proportional plus integral response. The gain of the position controller 46 (i.e., the integrating time constant) is adjusted to obtain a critically damped speed response for a step input to the system. The gain of the position feedback is adjusted such that when the position reference signal 50 is disconnected by the opening of relay contact 3R, and if the spindle is not at its desired position, it will slowly turn to its proper orientation without any overshoot.

To provide a feeling for the type and characteristics of the particular elements involved in this system, specified characteristics of the apparatus are provided within their respective blocks in the block diagram of FIG. 1.

The (a) curves indicate the time response of the output to a step input with the x-axis being time ($t$) and the y-axis the output ($V_o$) and the (b) curves indicate the input output characteristic over the desired operating range of each particular apparatus wherein the x-axis represents the input variable ($V_i$) and the y-axis represents the output variable ($V_o$).

Referring now to FIG. 2, a mathematical equivalent of the position loop control is presented using Laplace transforms. The actuating signal, $E/U_R$, into block 80 is the difference of the normalized reference input signal, $U_r/U_R$ and the normalized feedback signal, $U_B/U_R$ where:

$U_r$ = reference signal
$U_R$ = rated voltage level
$U_B$ = feedback signal

Block 80 represents the transfer function of a closed loop speed regulator which provides a speed output, $W/W_R$ where:

W = actual speed
$W_R$ = rated speed

Block 90 represents the integrator relationship between a normalized speed signal and a spindle position signal, $\theta$ divided by $\theta_R$ where:

$\theta$ = actual position
$\theta_R$ = rated angular displacement in one revolution Position feedback is through a feedback network designated by a block 96.

FIG. 3 is the diagram of one embodiment of the position sensor which corresponds to position sensor 44 in FIG. 1. A position sensor consists of three components: a sensing element 60, a balance element 62 and an actuating member (a piece of magnetic strip) 40. The sensing element 60 contains a U-shaped core 61 with windings A and B facing the sensing surface. Winding A is connected to balance element winding C which is then connected to the A–C power source 64. The winding B is connected to balance element winding D which connects to an A–C amplifier 66. The polarity of the windings is indicated by the dots associated with each winding. Output from the A–C amplifier 66 serves as an input through a phase sensitive demodulator 68.

Bringing the actuating member 40 near the sensing element 60 increases the magnetic coupling between windings A and B and thus the voltage induced in the winding B. The A-C output or the input to the A-C amplifier 66 is the difference of the voltages across windings B and D. Therefore maximum coupling between the windings A and B due to the actuating member produces a maximum signal to the A-C amplifiers 66. With minimum coupling between windings A and B, the input to the A-C amplifier 66 is again maximum but it is 180° out of phase with respect to the A-C reference input 64. Input to the A-C amplifier 66 is zero when the voltage induced in the windings B and D is equal.

The A-C signal which serves as input to the A-C amplifier 66 is amplified and then converted to D-C by the phase sensitive demodulator 68 such that the output is positive with respect to ground when the output from the amplifier 66 is in phase with the reference signal and is negative when the amplifier 66 output is 180° out of phase with respect to A-C reference.

Referring now to FIG. 4, output characteristics for the position sensor described and shown in FIG. 3 are shown by the graph relating displacement in degrees to the D-C output of the position sensor. It should be noted that the transfer curve is linear over the range near the desired roll receiving position. Thus, as the spindle approaches its desired position, the speed with which it approaches gradually decreases until reaching the exact position. At this point there is no output signal being generated by the position sensor.

Other than the linear control systems described, there are other types of systems which may be used to provide position control. For instance, it might be advantageous to use a non-linear network in the feedback path as shown in FIG. 2. In this case, a non-linear position sensor will provide either a positive or negative reference signal to the position controller depending upon the direction of the position error. The reference signal would be positive for negative error and negative for positive error. The magnitude for this signal would be constant and not proportional to the position error that was demonstrated in the case of a linear system.

Figure 5:
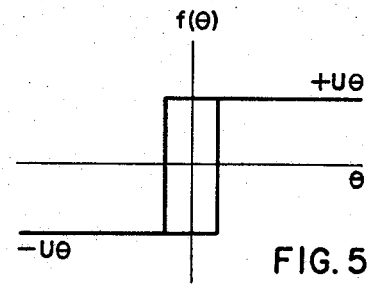
FIGS. 5 and 6 show switching characteristics for an ON-OFF (non-linear) position control system.

One type of non-linear system is an ON-OFF system having a switching relay with a hysteresis. This results in a system with an oscillatory response as shown in FIG. 5. If there is no stable equilibrium state, the output oscillates with the amplitude and frequency described by its "limit cycle." The amplitude of the oscillations depends both on the magnitude of the switching signal $U_\theta$ and the hysteresis loop. The smaller the value of the switching signal $U_\theta$, the smaller is the amplitude of oscillations. The frequency of oscillations depends upon the response of the speed loop, the hysteresis loop and the magnitude of the switching signal $U_\theta$. A significant advantage of this system using this type of non-linear switching is that the *controlled* oscillation of the spindle would facilitate the pushing in of the rolls to their proper positions.

Figure 6:
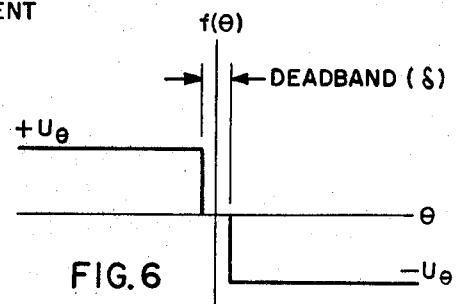

Another type of ON-OFF system which might be used would contain a small deadband around $\theta=0$. The characteristics of a switching element of this type may be seen in FIG. 6. By using two separate sensing heads and two limit switches, a small deadband δ is provided at the desired roll receiving position. This system does have an equilibrium state but the manner in which it approaches depends upon the magnitude of the switching signal $U_\theta$ and the response of the speed loop. Since there is a deadband in the switching circuit, a steady-state error equal to the deadband would exist.

Figure 7:
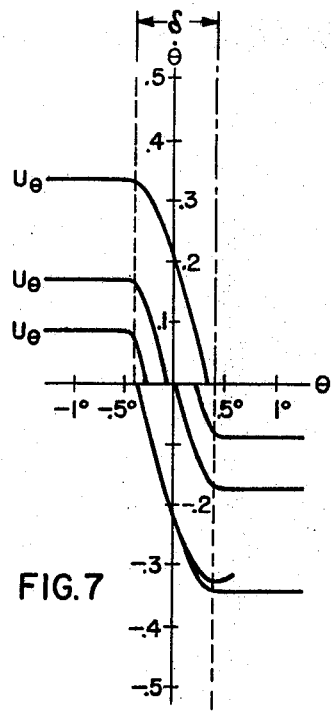
FIGS. 7 and 8 are switching curves for an ON-OFF (non-linear) feedback system having a predetermined deadband.

FIG. 7 shows the operating characteristics for a system having a deadband of 0.5° for three different values of the switching signal $U_\theta$. As the spindle approaches its desired position from the negative direction, it proceeds at a constant speed based on the level of the switching signal $U_\theta$ until it reaches the deadband limit at −0.5°. Thereupon, one switching occurs and the driving signal $U_\theta$ is withdrawn thereby causing the spindle to rotate or come to a position of rest based upon its original momentum. As shown in FIG. 7, for all three switching signals, the spindle would come to rest within the predetermined deadband range. A like situation occurs when the spindle is approaching its proper position from the positive direction.

Figure 8:
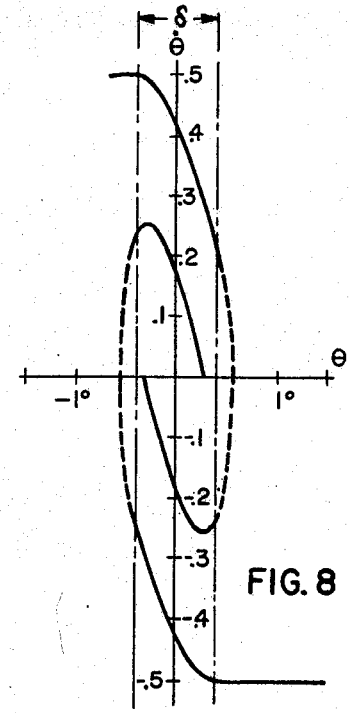

In FIG. 8, operating characteristics is shown where the speed at which the spindle approaches the deadband δ is sufficiently great to cause it, by its own momentum to exceed the deadband limits of the opposite polarity. As shown in FIG. 8 it would then require two separate switchings to cause the spindle to come to rest within the predetermined deadband δ. As the spindle approaches the deadband from the negative direction, a positive reference signal is being applied which turns the spindle at a predetermined speed. As soon as the spindle reaches the deadband δ, the reference signal is withdrawn and the spindle continues to coast on its own momentum until it actually exceeds the deadband limit on the positive side. At this point a reference signal is supplied of the opposite polarity which then drives the spindle in the opposite direction until it reaches the deadband from the positive side whereupon the reference signal is once again removed causing the spindle to come to rest within its proper and predetermined dadband range. Although the situation of this type requires multiple switching, it may nevertheless still be advisable inasmuch as the spindle approaches the deadband at a much increased rate than that shown in FIG. 7.

Since additional changes not herein specifically referred to may be made in the above described article, and different embodiments of the invention could be made without departing from the scope thereof, it is intended that all matter contained in the above description or shown in the accompanying drawing shall be interpreted as illustrative only and not in a limiting sense.

We claim as our invention:

1. In a positioning system for changing roll sets at a rolling stand by positioning the roll receiving spindle to match the roll set position and using the main drive motors of the rolling stand to change the spindle position, the combination of;

position reference means for providing a position reference signal, position sensing means responsive to the position of said roll receiving spindle and providing a position feedback signal having a functional relationship with the relative displacement of said roll receiving spindle from its desired position, position controller means responsive to said position reference signal to provide a first component output signal to said main drive motors and responsive to said position feedback signal to provide a second component output signal to said main drive motors.

2. The positioning system as set forth in claim 1, wherein said position sensing means includes;

actuator means to provide a position signal proportional to the relative displacement of said spindle from its desired position.

feedback switching means responsive to said position signal to provide said position feedback signal.

3. The position sensing means as set forth in claim 2, wherein said feedback switching means provides a position feedback signal linear and proportional to the relative distance of the roll receiving spindle from its desired position.

4. The position sensing means as set forth in claim 2, wherein said feedback switching means provides a non-linear position feedback signal with no stable equilibrium state resulting in a predetermined oscillatory movement by the spindle about its desired position.

5. The position sensing means as set forth in claim 2, wherein said feedback switching means provides a non-linear position feedback signal having a predetermined signal level when a spindle is outside a predetermined range of its desired position and an absence of said predetermined signal level when a spindle is inside a predetermined range of its desired position.

6. In a positioning system for aligning a motor driven element in a predetermined and desired position, the combination of;

operational means for normal operation of said motor driven element, positioning control means responsive to the relative position of said motor driven element and operative to provide a correction signal to said operational means in a manner to place said motor driven element in said desired position, switching means for selectively deenergizing a portion of said operational means and energizing said position control means whenever positioning of the motor driven element is desired.

7. The positioning system as set forth in claim 6, wherein said positioning control means includes;

position sensing means for sening the relative displacement of said motor driven element from its desired position and providing a first position input signal proportional thereto, positioning control means responsive to at least one position input signal providing a position control signal to the remaining energized portion of said operational means for altering the position of said motor driven element to or within a predetermined range of its desired position, position reference means operable when said motor driven element is outside a second predetermined range and providing a second position input signal complementary to said first position signal for more rapid positioning of the motor driven element when its orientation is outside said second predetermined range.

8. The position sensing means as set forth in claim 7, wherein said first position input signal is linear and proportional to the relative displacement of said motor driven element from its desired position.

9. The position sensing means as set forth in claim 7, wherein said first position input signal includes switching means having no stable equilibrium state and thereby providing a predetermined oscillatory motion of said motor driven element about its desired position.

10. The position sensing means as set forth in claim 7, wherein said first position input signal includes switching means which provide for a predetermined signal deadband about the desired equilibrium position for said motor driven element.

References Cited

UNITED STATES PATENTS

| 2,911,804 | 11/1959 | O'Brien | 72—249 |
| 3,293,898 | 12/1967 | Thomas et al. | 72—249 |

RICHARD J. HERBST, Primary Examiner

U.S. Cl. X.R.

72—26, 238, 249